(12) United States Patent
Harada et al.

(10) Patent No.: US 11,540,240 B2
(45) Date of Patent: Dec. 27, 2022

(54) TERMINAL, RADIO COMMUNICATION METHOD, BASE STATION, AND SYSTEM

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 6 days.

(21) Appl. No.: 17/383,061

(22) Filed: Jul. 22, 2021

(65) Prior Publication Data

US 2021/0352602 A1    Nov. 11, 2021

Related U.S. Application Data

(63) Continuation of application No. 16/495,953, filed as application No. PCT/JP2017/011505 on Mar. 22, 2017, now Pat. No. 11,102,739.

(51) Int. Cl.
| | |
|---|---|
| *H04W 56/00* | (2009.01) |
| *H04L 5/00* | (2006.01) |
| *H04W 88/06* | (2009.01) |
| *H04W 72/04* | (2009.01) |
| *H04W 72/12* | (2009.01) |

(52) U.S. Cl.
CPC ......... *H04W 56/001* (2013.01); *H04L 5/0048* (2013.01); *H04L 5/0053* (2013.01); *H04W 72/0453* (2013.01); *H04W 72/1205* (2013.01); *H04W 88/06* (2013.01)

(58) Field of Classification Search
CPC ........... H04W 56/001; H04W 72/0453; H04W 72/1205; H04W 88/06; H04L 5/0048; H04L 5/0053
See application file for complete search history.

(56) References Cited

U.S. PATENT DOCUMENTS

| | | | | |
|---|---|---|---|---|
| 10,111,221 | B2* | 10/2018 | Wang | H04W 72/0446 |
| 10,123,340 | B2* | 11/2018 | Seo | H04W 72/042 |
| 10,257,856 | B2* | 4/2019 | Park | H04L 1/1887 |
| 2014/0241150 | A1 | 8/2014 | Ng et al. | |
| 2015/0358945 | A1 | 12/2015 | Susitaival et al. | |

(Continued)

FOREIGN PATENT DOCUMENTS

| | | |
|---|---|---|
| CN | 104219757 A | 12/2014 |
| JP | 2016-039581 A | 3/2016 |

OTHER PUBLICATIONS

International Search Report issued in PCT/JP2017/011505 dated May 30, 2017 (2 pages).

(Continued)

*Primary Examiner* — Chandrahas B Patel
(74) *Attorney, Agent, or Firm* — Osha Bergman Watanabe & Burton LLP

(57) ABSTRACT

A terminal is disclosed that includes a receiver that receives by higher layer signaling in a first cell, when a plurality of cells including the first cell and a second cell are configured, information related to a synchronization signal block index indicated by using a bitmap. The terminal also includes a controller that controls a reception of a synchronization signal block based on the information related to the synchronization signal block index. In other aspects, a radio communication method, a base station, and a system are also disclosed.

12 Claims, 14 Drawing Sheets

(56) References Cited

U.S. PATENT DOCUMENTS

| | | |
|---|---|---|
| 2017/0150461 A1 | 5/2017 | Li et al. |
| 2018/0241605 A1 | 8/2018 | Luo |
| 2018/0248642 A1 | 8/2018 | Si et al. |
| 2019/0380099 A1 | 12/2019 | Hakola et al. |
| 2019/0393972 A1 | 12/2019 | Pan et al. |
| 2020/0245228 A1 | 7/2020 | Rune et al. |

OTHER PUBLICATIONS

Written Opinion of the International Searching Authority issued in PCT/JP2017/011505 dated May 30, 2017 (4 pages).
NTT Docomo, Inc.; "Discussion on NR-PBCH design"; 3GPP TSG RAN WG1 Meeeting #88, R1-1702827; Athens, Greece; Feb. 13-17, 2017 (8 pages).
Extended European Search Report issued in counterpart European Patent Application No. 17902110.0, dated Oct. 26, 2020 (10 pages).
NTT Docomo, Inc. (Rapporteur); "RAN WG's progress on NR technology SI in the January ad-hoc meeting"; 3GPP TSG-RAN WG2 #97, R2-1701059; Athens, Greece, Feb. 13-17, 2017 (38 pages).
MCC Support; "Draft Report of 3GPP TSG RAN WG1 #88 v0.1.0"; 3GPP TSG RAN WG1 Meeting #88bis, R1-17xxxxx; Spokane, USA, Apr. 3-7, 2017 (145 pages).
MCC Support; "Draft Report of 3GPP TSG RAN WG1 #AH1_NR v0.1.0 (Spokane, USA, Jan. 16-20, 2017)"; 3GPP TSG RAN WG1 Meeting #88, R1-17xxxxx; Athens, Greece; Feb. 13-17, 2017 (105 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Japanese Patent Application No. 2019-506804, dated Apr. 27, 2021 (6 pages).
LG Electronics; "Discussion on SS burst set composition and time index indication"; 3GPP TSG RAN WG1 Meeeting #88, R1-1702434; Athens, Greece; Feb. 13-17, 2017 (3 pages).
Office Action issued in the counterpart Chinese Patent Application No. 201780090705.9, dated May 6, 2021 (14 pages).
NTT Docomo, Inc.; "Discussion on SS Burst set composition and SS block index indication for NR"; 3GPP TSG RAN WG1 Meeting #88, R1-1702823; Athens, Greece; Feb. 13-17, 2017 (8 pages).
Spreadtrum Communications; "Indication of the SS-block index in multi-beam cases"; 3GPP TSG RAN WG1 AH_NR Meeting, R1-1700288; Spokane, USA; Jan. 16-20, 2017 (4 pages).
Huawei, HiSilicon; "Discussion and evaluation on NR-SS multiplexing and bandwidth"; 3GPP TSG RAN WG1 NR Ad Hoc Meeting, R1-1700033; Spokane, USA; Jan. 16-20, 2017 (12 pages).
Office Action issued in the counterpart Japanese Patent Application No. 2019-506804, dated Aug. 31, 2021 (8 pages).
Huawei, HiSilicon; "Discussion and evaluation on NR-SS periodicity"; 3GPP TSG RAN WG1 NR Ad Hoc Meeting, R1-1700046; Spokane, USA, Jan. 16-20, 2017 (4 pages).
Sony; "Scheduling information for on demand SI provided by broadcast"; 3GPP TSG RAN WG2 Meeting #97, R2-1701500; Athens, Greece; Feb. 13-17, 2017 (2 pages).
Vodafone; "Background information on Architectures 3/3a/3x and Dual Connectivity"; SA WG2 Meeting #120, Tdoc S2-172281; Busan, Korea, Mar. 27-31, 2017 (8 pages).
Intel Corporation; "Further discussion on GI-DFT-s-OFDM for high frequency bands above 40 GHz"; 3GPP TSG RAN WG1 Meeting #87, R1-1612589; Reno, USA, Nov. 14-18, 2016 (9 pages).

* cited by examiner

TERMINAL, RADIO COMMUNICATION METHOD, BASE STATION, AND SYSTEM

CROSS-REFERENCE TO RELATED APPLICATIONS

This application is a continuation application of U.S. patent application Ser. No. 16/495,953, filed on Sep. 20, 2019, which is a national phase application of PCT/JP2017/011505, filed on Mar. 22, 2017. The contents of these applications are hereby incorporated by reference in their entirety.

TECHNICAL FIELD

The present invention relates to a terminal, a radio communication method, a base station, and a system in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12" or "LTE Rel. 13") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed with different radio base stations are configured in a UE, is also introduced. Each cell group is comprised of at least 1 cell (or CC). In DC, since multiple CCs of different radio base stations are integrated, DC is also referred to as "inter-eNB CA."

Also, in existing LTE systems (for example, LTE Rel. 8 to 13), synchronization signals (PSS/SSS), broadcast channel (PBCH) and so on which a user terminal uses in initial access procedures are allocated, on a fixed basis, in fields that are determined in advance. By detecting the synchronization signals in cell search, the user terminal can establish synchronization with the network, and, furthermore, identify the cell (for example, cell ID) at which the user terminal should connect with. Furthermore, the user terminal can acquire system information by receiving the broadcast channel (PBCH and SIB) after the cell search.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.). For example, regarding 5G/NR, studies are in progress to provide radio communication services, referred to as "eMBB (enhanced Mobile Broad Band)," "IoT (Internet of Things)," "mMTC (massive Machine Type Communication)," "M2M (Machine To Machine)," and "URLLC (Ultra Reliable and Low Latency Communications)."

In addition, 5G/NR is expected to support flexible use of numerologies and frequencies, and realize dynamic frame configurations. Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame configuration, the filtering process, the windowing process, and so on).

When cells that use different numerologies than existing LTE systems (also referred to as "NR/5G-cell") are supported, it is likely that a user terminal communicates by using a number of cells including these NR/5G-cells (for example, by using CA and/or DC). However, how to control communication using multiple cells including NR/5G-cells is not decided.

The present invention has been made in view of the above, and it is therefore an object of the present invention to provide a user terminal and a radio communication method, whereby communication to use a number of cells, including cells that use different numerologies than existing LTE systems, can be controlled properly.

Solution to Problem

According to one aspect of the present invention, a user terminal has a receiving section that receives, from the first cell, information about synchronization between the first cell and the second cell and/or information about a configuration of a synchronization signal block in the second cell, and a control section that controls a processes for connecting with the second cell based on the information about synchronization and/or the information about the configuration of the synchronization signal block.

Advantageous Effects of Invention

According to the present invention, communication to use a number of cells, including cells that use different numerologies than existing LTE systems, can be controlled properly.

DESCRIPTION OF EMBODIMENTS

In existing LTE systems, carrier aggregation (CA) and dual connectivity (DC) are supported as communication methods to use a number of cells (or CCs).

Figure 1A:
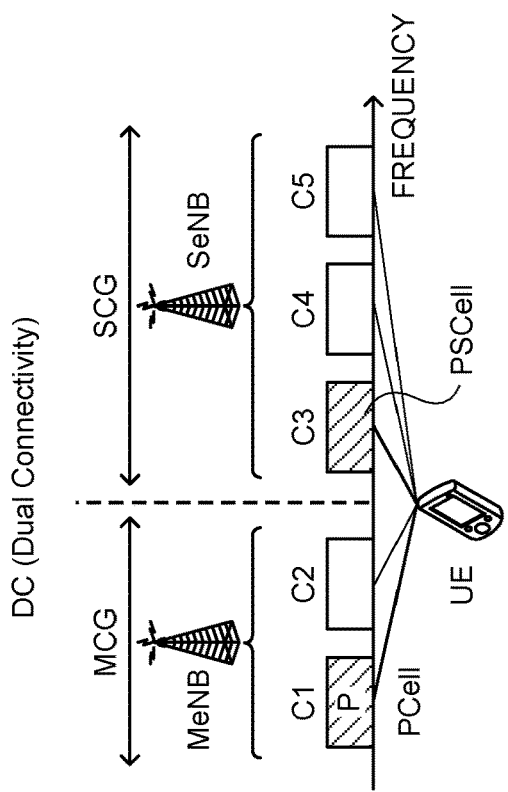
FIGS. 1A and 1B are diagrams to explain the concepts of CA and DC.

FIG. 1A shows communication between radio base stations and a user terminal when CA is used. In the example shown in FIG. 1A, radio base station eNB 1 may be a radio base station to form a macro cell (hereinafter referred to as "macro base station"), and radio base station eNB 2 may be a radio base station to form a small cell (hereinafter referred to as "small base station"). For example, a small base station may be structured as an RRH (remote radio head) that connects with a macro base station.

When CA is used, 1 scheduler (for example, a scheduler provided in macro base station eNB 1) controls the scheduling of multiple cells. In a design in which the scheduler provided in macro base station eNB 1 controls the scheduling of a number of cells, for example, each radio base station can be connected using an ideal backhaul, which is, for example, a high-speed channel such as optical fiber.

Figure 1B:
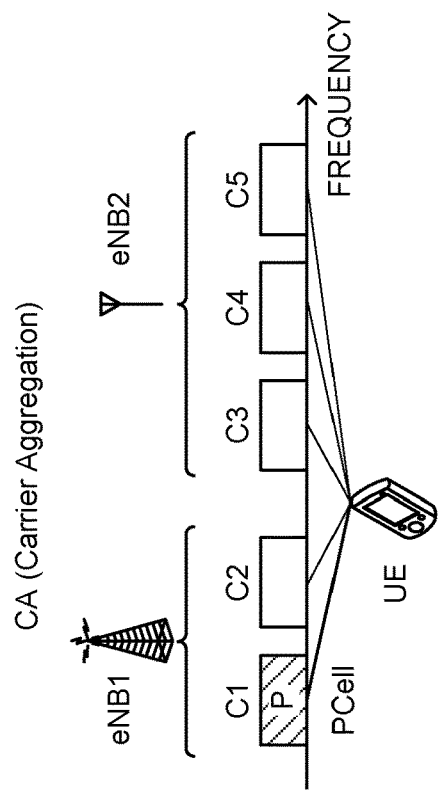

FIG. 1B shows communication between radio base stations and a user terminal when DC is used. When DC is used, a design may be employed, in which a number of schedulers are provided independently, and these schedulers each control the scheduling of one or more corresponding cells. To be more specific, the scheduler provided in the master base station (MeNB (master eNB)) schedules the CCs belonging to the master cell group (MCG). To be more specific, the scheduler provided in a secondary base station (SeNB (Secondary eNB)) schedules the CCs belonging to a secondary cell group (SCG).

In a design in which the scheduler provided in a master base station MeNB and the scheduler provided in a secondary base station SeNB each control the scheduling of one or more corresponding cells, for example, these radio base stations may be connected using non-ideal backhaul such as the X2 interface. Therefore, DC enables 2 patterns of operations that might apply to the case where the master base station MeNB and the secondary base station SeNB are synchronized for a certain level of reliability (synchronous operation), and the case where no such synchronization is assumed (asynchronous operation).

Also, in an SCG, a PSCell (Primary Secondary Cell), which has functions equivalent to those of a primary cell (PCell), such as a common search space, a PUCCH, being seen as always activated and so on, is configured.

Future radio communication systems are also expected to support stand-alone (SA) communication, in which a newly-introduced carrier (also referred to as an "NR carrier" or an "NR cell") can run alone, and, in addition, to support communication (CA and/or DC) to use a number of cells, including at least an NR carrier. For example, DC may be implemented by configuring radio base stations (LTE-eNBs) that support existing LTE systems in an MCG, and configuring radio base stations (NR-gNBs) that support NR/5G in an SCG.

To be more specific, cells that support existing LTE system (LTE cells) constitute an MCG, and cells that support NR/5G (NR cell) constitute an SCG. The network (for example, a radio base station) reports system information from an MCG cell (for example, PCell) to a user terminal. The user terminal receives system information (broadcast information) that is necessary for downlink communication, in, for example, the MIB (Master Information Block), which is transmitted in the broadcast channel (PBCH), and the like.

In the PBCH (MIB), information that is necessary to receive the downlink (downlink bandwidth, downlink control channel format, system frame number (SFN), etc.) is set forth in predetermined bits. The user terminal controls receipt of SIBs (System Information Blocks), which are communicated in the downlink shared data channel (PDSCH), based on the LTE-PBCH. By receiving SIBs, the user terminal can acquire minimum system information that is necessary to make communication.

Meanwhile, when the user terminal communicates with an SCG cell that supports NR/5G, the user terminal needs to acquire the radio frame timing and the system frame number (SFN) of the SCG. Therefore, the user terminal might acquire the SCG's radio frame timing and SFN by using signals transmitted from NR cells included in the SCG (for example, PSCell). For example, the user terminal acquires the radio frame timing (establishes synchronization) by using a synchronization signal (NR-SS) transmitted from an NR cell, and, furthermore, acquires the SFN by using a broadcast channel (NR-PBCH). This allows, even when an LTE-eNB (MCG) and an NR-gNB (SCG) operate asynchronously, the user terminal to synchronize with an NR cell (PSCell) that is included in the SCG, and identify the SFN.

<SS Blocks>

Furthermore, 5G/NR are under study to define a resource unit that at least contains synchronization signals (for example, NR-PSS and/or NR-SSS (hereinafter also referred to as "NR-PSS/SSS")) as an "SS block," and to communicate by using these SS blocks. An SS block (synchronization signal block) may be configured to contain a broadcast channel (for example, NR-PBCH). In this case, the location of the SS block and/or the number of prospective SS blocks may be defined in the specification, on a fixed basis, per predetermined frequency band, so that, when the user terminal detects an SS block, the user terminal can determine at least one of the slot, subframe and radio frame timings based on this SS block (such as time index information corresponding to the SS block).

Also, in 5G/NR, studies on single-beam or multi-beam operation are underway. For example, during multi-beam operation, it may be possible to repeat transmitting a whole SS burst set, which is comprised of multiple SS blocks, on a regular basis.

Figure 2:
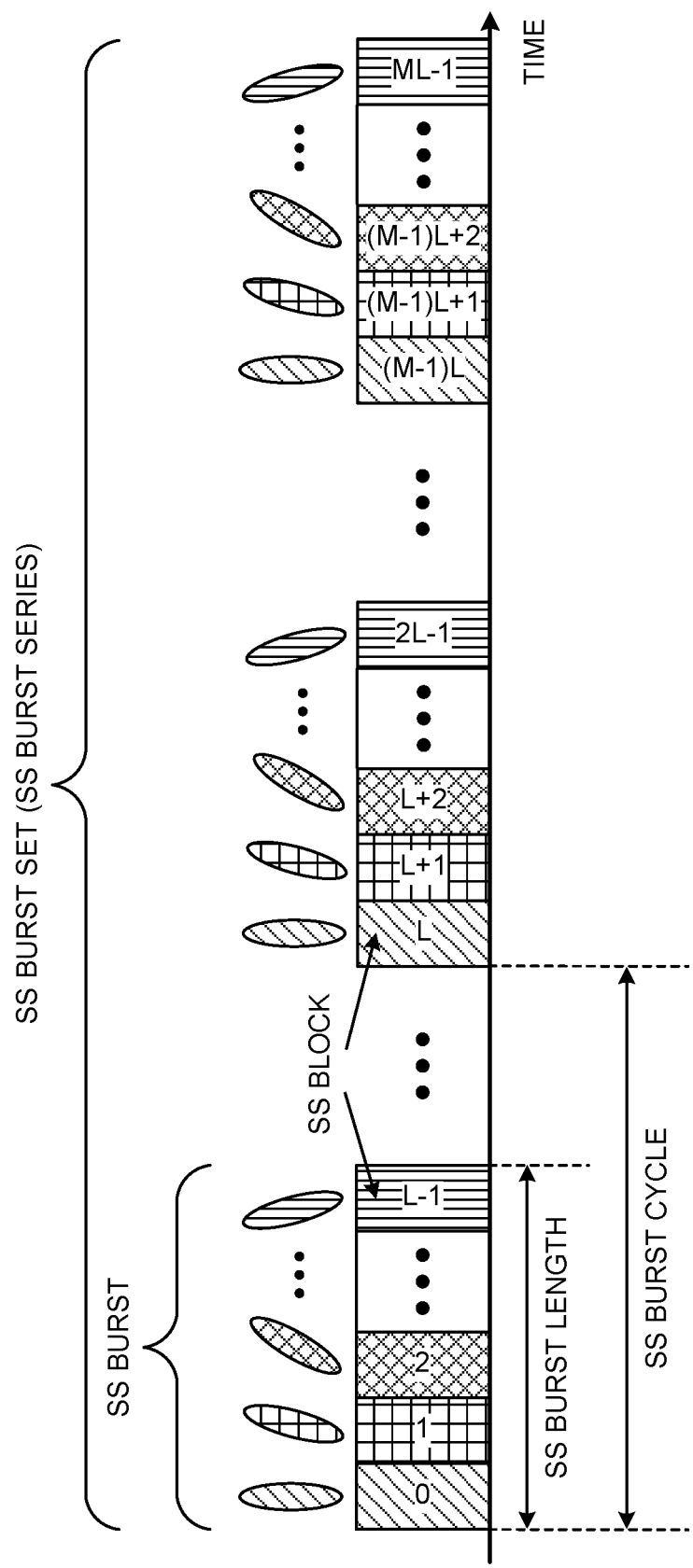
FIG. 2 is a diagram to explain the concept of SS blocks.

Now, SS blocks will be described below with reference to FIG. 2. FIG. 2 is a diagram to explain the concept of SS blocks. An SS block, as illustrated in FIG. 2, at least contains a PSS (NR-PSS), SSS (NR-SSS) and PBCH (NR-PBCH). Note that synchronization signals other than the PSS and SSS (for example, a TSS (Tertiary SS)) may be included in SS blocks.

The user terminal detects the NR-PSS/SSS/PBCH corresponding to the same SS block index. The PSS, SSS and PBCH that correspond to the same SS block index are associated with each other. For example, the user terminal may assume that the PSS, SSS and PBCH that correspond to the same SS block index are transmitted in the same beam. Note that the PSS, the SSS and the PBCH in the following description may be understood as meaning the PSS for NR (NR-PSS), the SSS for NR (NR-SSS) and the PBCH for NR (NR-PBCH), respectively.

A set of one or multiple SS blocks may be referred to as an "SS burst." FIG. 2 shows an example of SS burst length=L. In this example, an SS burst is comprised of L SS blocks (SS block indices #0 to #L−1) that are contiguous in time, but this is by no means limiting. An SS burst may be formed with SS blocks in which the frequency and/or time resources are contiguous, or may be formed with SS blocks in which the frequency and/or time resources are non-contiguous.

It is preferable that SS bursts are transmitted in a predetermined cycle (which may be referred to as "SS burst cycle"). Alternatively, SS bursts may not be transmitted on a regular basis (and may be transmitted aperiodically). Also, one or more SS bursts may be referred to as an "SS burst set (SS burst series)." For example, a base station and/or a UE may apply beam sweeping to the PSS/SSS/PBCH by using one or more SS bursts included in 1 SS burst set, and transmit these signals. Note that SS burst sets are transmitted periodically. The UE may control receiving processes on assumption that SS burst sets are transmitted periodically (in an SS burst set cycle).

The PSS and the SSS, or the PSS (SSS) and the PBCH may be time-division-multiplexed (TDM (Time Division Multiplexing)) or frequency-division-multiplexed (FDM (Frequency Division Multiplexing)).

A design may be employed here, in which prospective SS block locations are specified, by the specification, on a per frequency band basis, so that the user terminal can identify the index of an SS block based on signals from inside the SS block. This allows the user terminal to identify an SS block index from one or more signals in the SS block. For example, when the base station places an SS block index in an NR-PBCH and transmits this to the user terminal, the UE can acquire the SS block index from the PBCH upon receipt. Then, the user terminal can identify the time index (the symbol number, the slot number, etc.) corresponding to the SS block index that is acquired.

Figure 3:
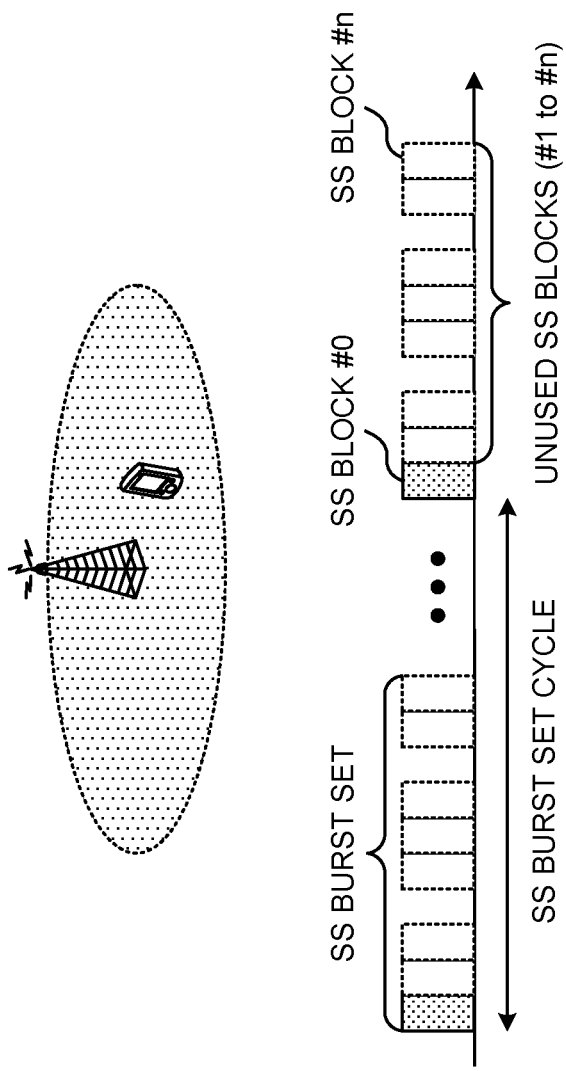
FIG. 3 is a diagram to show an example of an SS block transmission method for use during single-beam operation.

FIG. 3 shows an example of SS block configuration in the event single-beam operation is employed. FIG. 3 shows a case where an SS burst set supports n (for example, n=8) SS blocks (SS blocks #0 to #n−1), and the cycle of SS burst sets is configured to a predetermined value (for example, 20 ms).

The radio base station transmits a PSS/SSS/PBCH in a predetermined SS block (here, SS block #0). When the user terminal detects the PSS/SSS/PBCH corresponding to SS block #0, the user terminal can identify the time index that is defined in association with SS block #0 (for example, the first slot of a subframe). Also, resources for other SS blocks (here, SS blocks #1 to #n) may be used to allocate other signals such as data.

Figure 4:
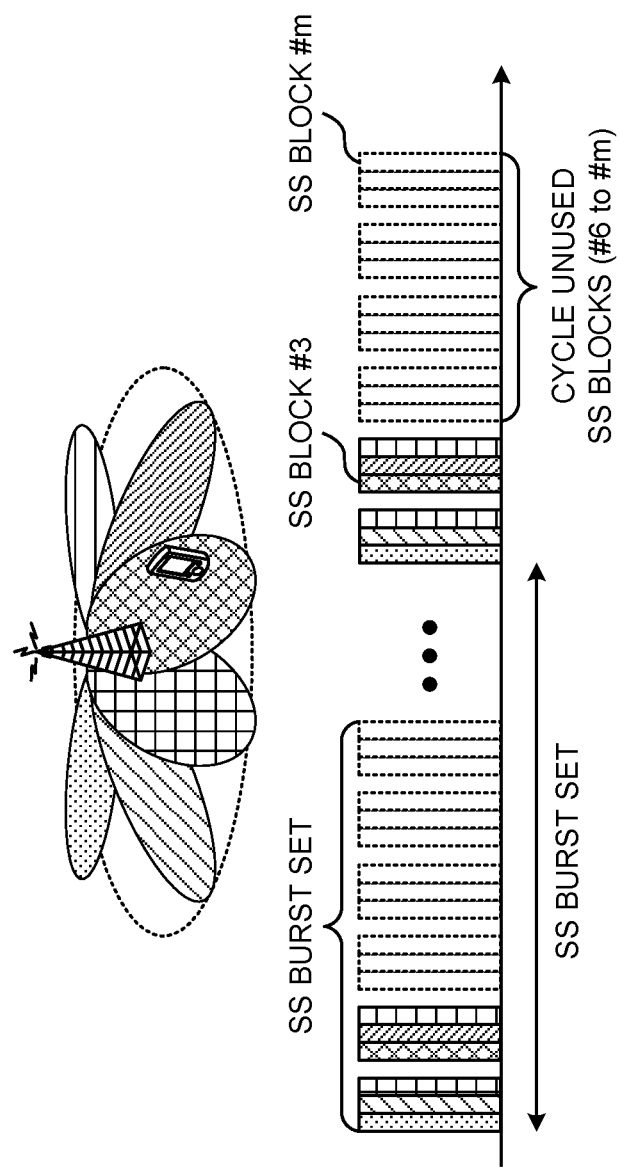
FIG. 4 is a diagram to show an example of an SS block transmission method for use during multi-beam operation.

FIG. 4 shows an example of SS block configuration in the event multi-beam operation is employed. FIG. 4 shows a case where an SS burst set supports m SS blocks (SS blocks #0 to #m−1), and the cycle of SS burst sets is configured to a predetermined value (for example, 20 ms). The radio base station transmits PSS/SSS/PBCH, corresponding to a number of predetermined SS blocks (here, SS blocks #0 to #5), respectively. In this case, the radio base station can apply different beams (here, 6 types of beams) to the SS blocks and transmit each SS block.

Note that the beam corresponding to each SS block may be a transmitting beam (Tx beam), or may be a pair of a transmitting beam and a receiving beam (Rx beam). A pair of a transmitting beam and a receiving beam may be referred to as a "beam pair link (BPL)."

When the user terminal detects the PSS/SSS/PBCH corresponding to a predetermined SS block (herein, SS block #3), the user terminal can identify the time index that is defined in association with this predetermined SS block #3. Also, resources for other SS blocks (here, SS blocks #6 to #m) may be used to allocate other signals such as data.

In this way, prospective SS block locations are defined in advance in association with time resources and/or the like, so that when the user terminal finds out an SS block index, the user terminal can also identify the symbol index and/or the slot index. Also, by defining prospective SS block locations in advance, the number of bits required to report SS block indices can be reduced.

Now, in the above-described communication (for example, DC) to use an LTE-eNB (MCG) and an NR-gNB (SCG), communication might be controlled based on synchronous operation. In this case, assuming that the radio frame is common (10 ms) between existing LTE and NR, the user terminal can identify SFNs without receiving broadcast channels (for example, NR-PBCH) transmitted from NR cells (for example, PSCell).

So, the present inventors have a focused on the point that, when communication to involve multiple cells is carried out, the processes for connecting with certain cells can be simplified depending on what mode of operation applies between these multiple cells (for example, synchronous operation), and the present inventors have come up with the idea of reporting information about the synchronization between these multiple cells to a user terminal, and controlling the processes for connecting with certain cells.

Also, the present inventors have come up with the idea of reporting assist information to a user terminal so as to allow the user terminal to identify the time indices pertaining to predetermined cells in units of symbols and/or slots.

Now, embodiments of the present invention will be described in detail below with reference to the accompanying drawings. Note that the radio communication methods according to the herein-contained embodiments may be used individually or may be used in combination. Also, although cases will be illustrated with the following description where dual connectivity (DC) is employed as the mode of communication to use a number of cells, this is by no means limiting. The present embodiment can be applied to communication using multiple cells.

FIRST EXAMPLE

Figure 5:
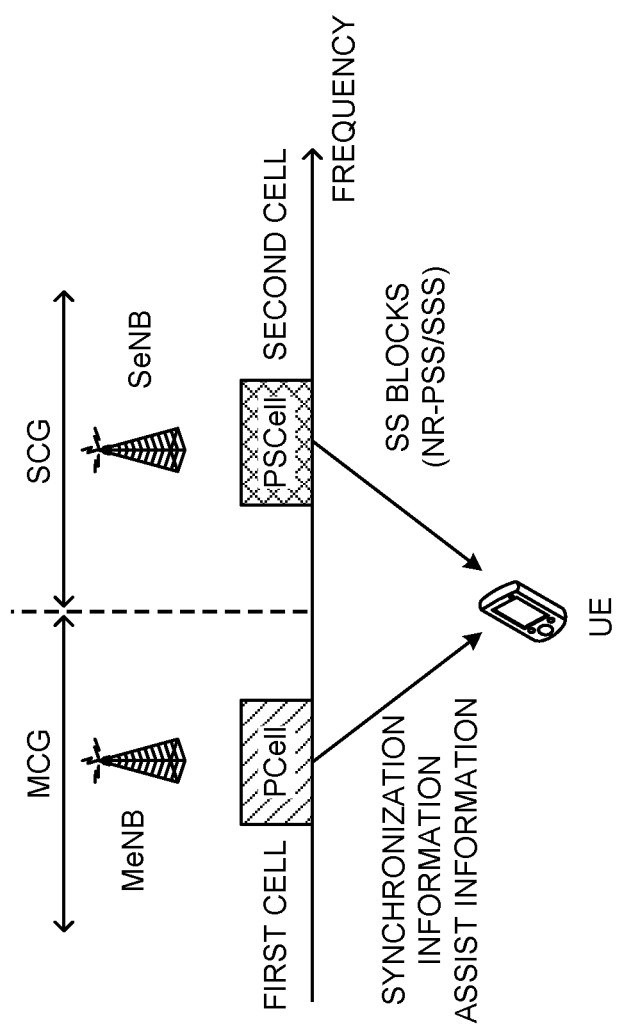
FIG. 5 is a diagram to explain a method of controlling communication based on synchronization information between a number of cells.

With a first example of the present invention, a case will be described in which, when a user terminal communicates by using a number of cells, including at least a first cell and a second cell, information about the synchronization between the first cell and the second cell is reported (see FIG. 5). Here, a case will be shown in which the first cell is a PCell and the second cell is a PSCell. Also, the cell group (MCG) to include the first cell is comprised of cells that support existing LTE systems or cells that support 5G/NR. Also, the cell group (SCG) to include the second cell is comprised of cells that support 5G/NR. Obviously, the number of cell groups, the cells that constitute cell groups and the like are by no means limited to these. In each cell group, one or more secondary cells may be included.

The network (for example, a radio base station) reports information about the synchronization (synchronization information) between the first cell and the second cell from the first cell to the user terminal. For example, when the radio base station (MeNB) reports system information by using higher layer signaling (for example, dedicated RRC signaling) in the first cell, the radio base station may report information about the synchronization between the first cell and other cells (here, the second cell) together.

Based on the synchronization information reported in the first cell, the user terminal determines whether or not synchronization is established between the first cell and the second cell, and controls the processes for connecting with the second cell. The connection processes include the process for receiving synchronization signals and/or broadcast signals (for example, SS blocks) and the like.

The synchronization information may be information that explicitly reports whether or not multiple cells are synchronized, or may be information that reports information about timing offsets (for example, SFN offsets). For example, the radio base station may report, to the user terminal, whether or not the SFN offset between the first cell and the second cell is less than a predetermined value (for example, less than 1), as synchronization information.

<Synchronous Operation>

If it is reported that varying cells are synchronized, the user terminal judges that the SFN is the same (for example, the SFN offset is less than 1) between these varying cells. Alternatively, the user terminal may judge that these varying cells operate synchronously when the SFN offset between these varying cells is less than a predetermined value, or judge that these varying cells operate asynchronously when the SFN offset is equal to or greater than the predetermined value.

The user terminal switches and controls at least part of the processes for connecting with the second cell based on synchronization information reported from the first cell. For example, if it is reported that the second cell is synchronized with the first cell, the user terminal may assume that the SFN of the second cell is the same as that of the first cell (for example, the SFN offset is less than 1), and exert control so that broadcast channel (for example, NR-PBCH) detection does not take place in the second cell. Thus, the NR-PBCH detection process in the user terminal can be skipped, and the receiving processes can be simplified.

Also, if it is reported that the second cell is synchronized with the first cell, the user terminal may assume that no broadcast channel (for example, NR-PBCH) is transmitted in the second cell. In this case, the user terminal may perform receiving processes on assumption that no NR-PBCH is contained in SS blocks.

Alternatively, synchronization information that indicates whether or not the second cell is synchronized with the first cell, and information about the configuration of a predetermined channel/signal (for example, NR-PBCH) in the second cell may be reported separately to the user terminal (see FIGS. 6A to 6D). For example, when the second cell (NR cell) works in non-stand-alone operation, the radio base station (MeNB) reports, to the user terminal, that no NR-PBCH is configured in the second cell (see FIG. 6B). In this case, the radio base station (SeNB) may transmit SS blocks not including the NR-PBCH. The user terminal may perform receiving processes on assumption that no NR-PBCH is contained in SS blocks.

If it is reported that no NR-PBCH is configured (or the user terminal judges that no NR-PBCH is detected), the user terminal may assume that the reference signal (for example, NR-PBCH DMRS) used to demodulate the NR-PBCH is not configured (transmitted) either, and perform receiving processes accordingly. In this case, the user terminal may exert control so that rate matching (for example, rate matching upon receipt of data (PDSCH)) is not performed for the NR-PBCH resource and/or the NR-PBCH DMRS resource. By this means, it is possible to reduce the load of receiving processes in the user terminal. On the other hand, when it is reported that the NR-PBCH is configured, the user terminal may exert control so that rate matching is always performed for the NR-PBCH resource and/or the NR-PBCH DMRS resource.

Also, the radio base station may report whether or not the DMRS for the NR-PBCH is configured, apart from whether or not the NR-PBCH is configured. When the DMRS for the NR-PBCH is configured, the user terminal may perform receiving processes (for example, rate matching) on assumption that the DMRS for the NR-PBCH is transmitted, even if it is reported that the NR-PBCH is not configured. Alternatively, the user terminal may perform receiving processes on assumption that the DMRS for the NR-PBCH is always transmitted, regardless of whether or not the DMRS for the NR-PBCH is configured and/or whether or not the NR-PBCH is configured.

Figure 6:
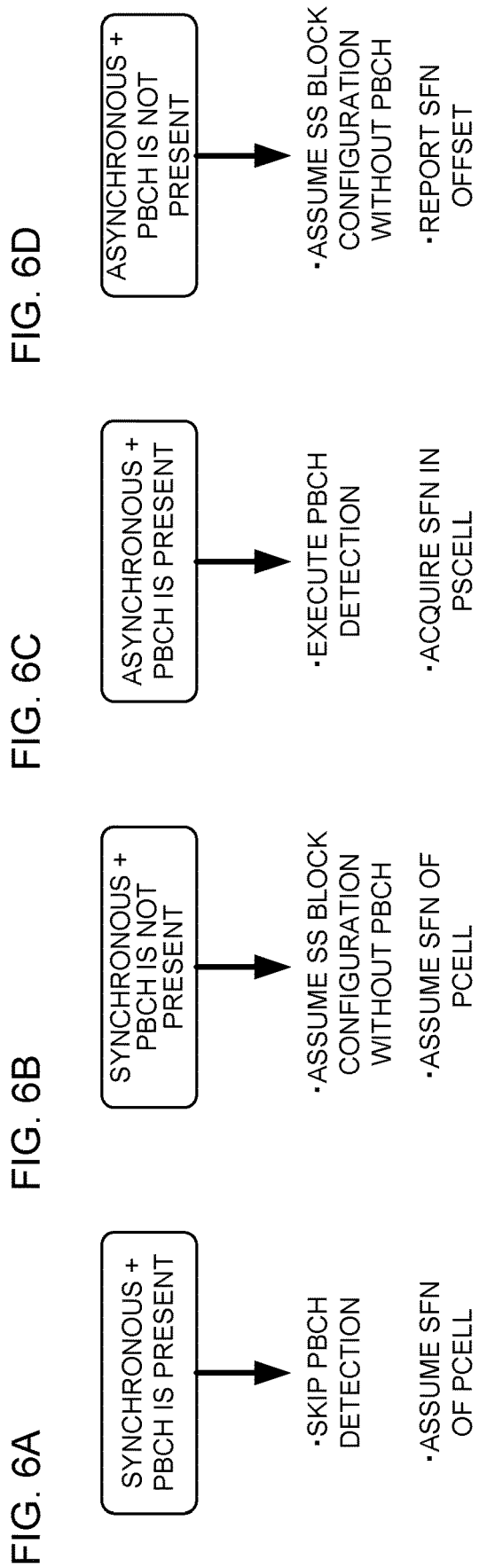
FIGS. 6A to 6D are diagrams to explain methods of controlling communication based on synchronization information between a number of cells and whether or not PBCH is configured.

For example, when the second cell (NR cell) works in non-stand-alone operation, it is reported to the user terminal that the NR-PBCH is configured in the second cell (see FIG. 6A). In this case, the radio base station (SeNB) places the NR-PBCH in SS blocks and transmits these for user terminals that directly connect to the second cell. A user terminal to connect to the first cell and the second cell can connect to the second cell based on information (for example, synchronization information) reported from the first cell, and therefore may be controlled not to detect the NR-PBCH (that is, skip PBCH detection) transmitted in the second cell. In this case, the NR-PBCH detection process in the user terminal can be skipped, and the receiving processes can be simplified.

FIGS. 7A to 7D show cases in which a user terminal is reported that no NR-PBCH is configured (or the user terminal judges that no NR-PBCH is detected), and performs receiving processes, in the second cell, based on the assumption of SS block configurations in which no NR-PBCH is configured. The left half of FIGS. 7A to 7D show SS block configurations for when NR-PBCHs are configured, and the right half of FIGS. 7A to 7D show SS block configurations for when NR-PBCHs are not configured. Also, FIGS. 7A to 7D show cases where the PSS, SSS and PBCH are all allocated in SS block configurations based on varying methods.

Figure 7:
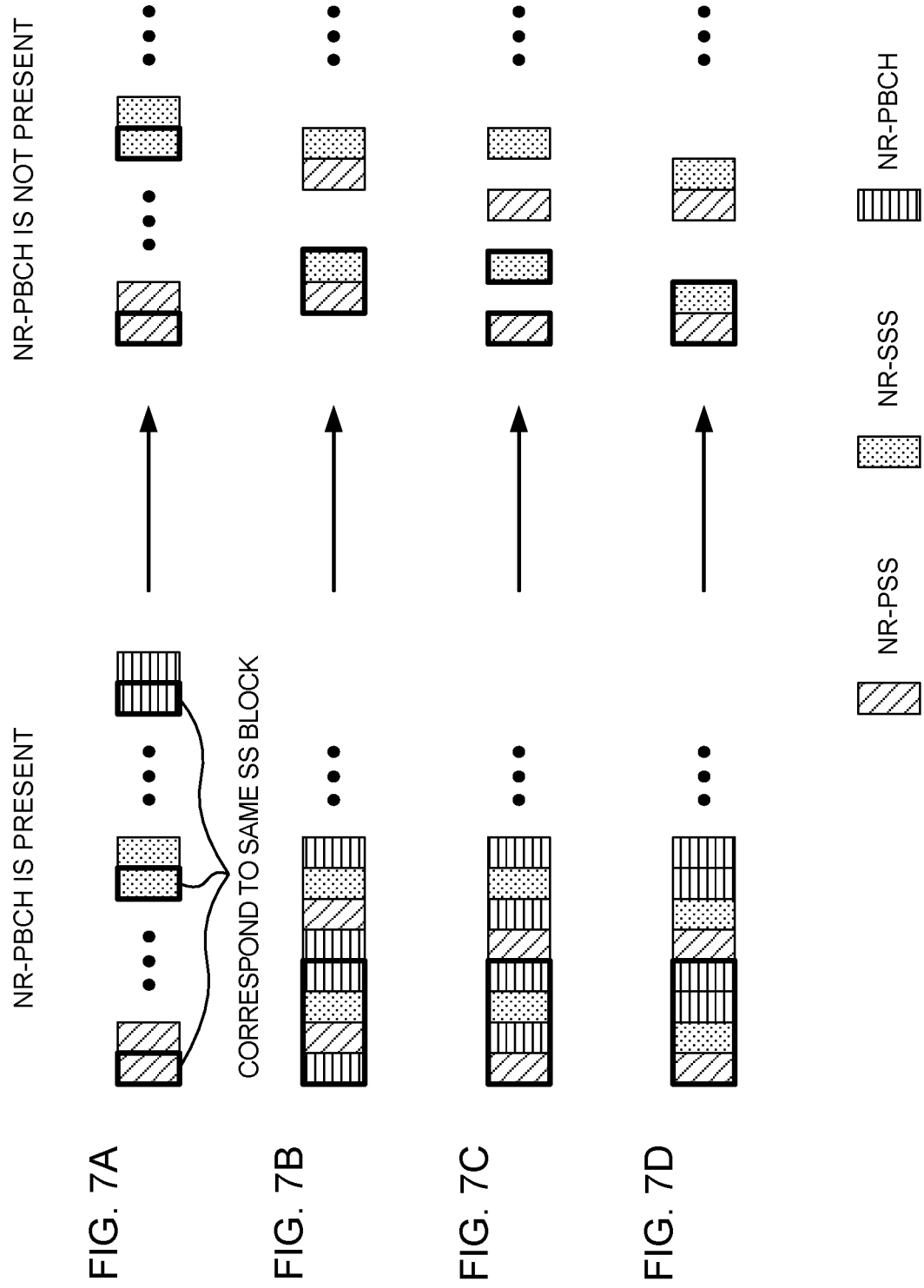
FIGS. 7A to 7D are diagrams to show examples of SS block configurations based on whether or not PBCH is configured.

In FIG. 7A, when an NR-PBCH is configured, the PSS, the SSS and the PBCH are all allocated in different time units (subframes, slots, etc.). When no NR-PBCH is configured (or no NR-PBCH is detected), the user terminal performs receiving processes (for example, detection) with respect to the PSS and the SSS, and does not perform receiving processes for the PBCH.

FIG. 7B shows a case where, when an NR-PBCH is configured, the PSS and the SSS, which are allocated contiguously, are allocated by being sandwiched by a number of PBCHs. FIG. 7C shows a case where, when an NR-PBCH is configured, the PBCH is allocated between the PSS and an SSS. FIG. 7D shows a case where, when an NR-PBCH is configured, the PSS and the SSS are allocated contiguously, and, furthermore, a number of NR-PBCHs are allocated contiguously. When no NR-PBCH is configured (or no NR-PBCH is detected), the user terminal performs receiving processes with respect to the PSS and the SSS, even in FIGS. 7B to 7D, and does not perform receiving processes for the PBCH.

When no NR-PBCH is configured in the second cell, other signals (for example, data) may be allocated to the NR-PBCH field in SS blocks where the NR-PBCH would have been configured. This makes it possible to improve the efficiency of the use of radio resources when the NR-PBCH is not configured.

FIGS. 7A to 7D show cases in which, even when no NR-PBCH is configured, SS blocks in which NR-PBCHs are configured are re-used (and in which, for example, the NR-PSS/SSS are allocated in the same locations), but these SS block configurations are by no means limiting. SS block configurations for when NR-PBCHs are configured, and SS block configurations for when NR-PBCHs are not configured may be defined both. In this case, SS block configurations for when NR-PBCHs are configured, and SS block configurations for when NR-PBCHs are not configured may be defined in the specification in advance (see FIG. 8), per frequency band.

Figure 8:
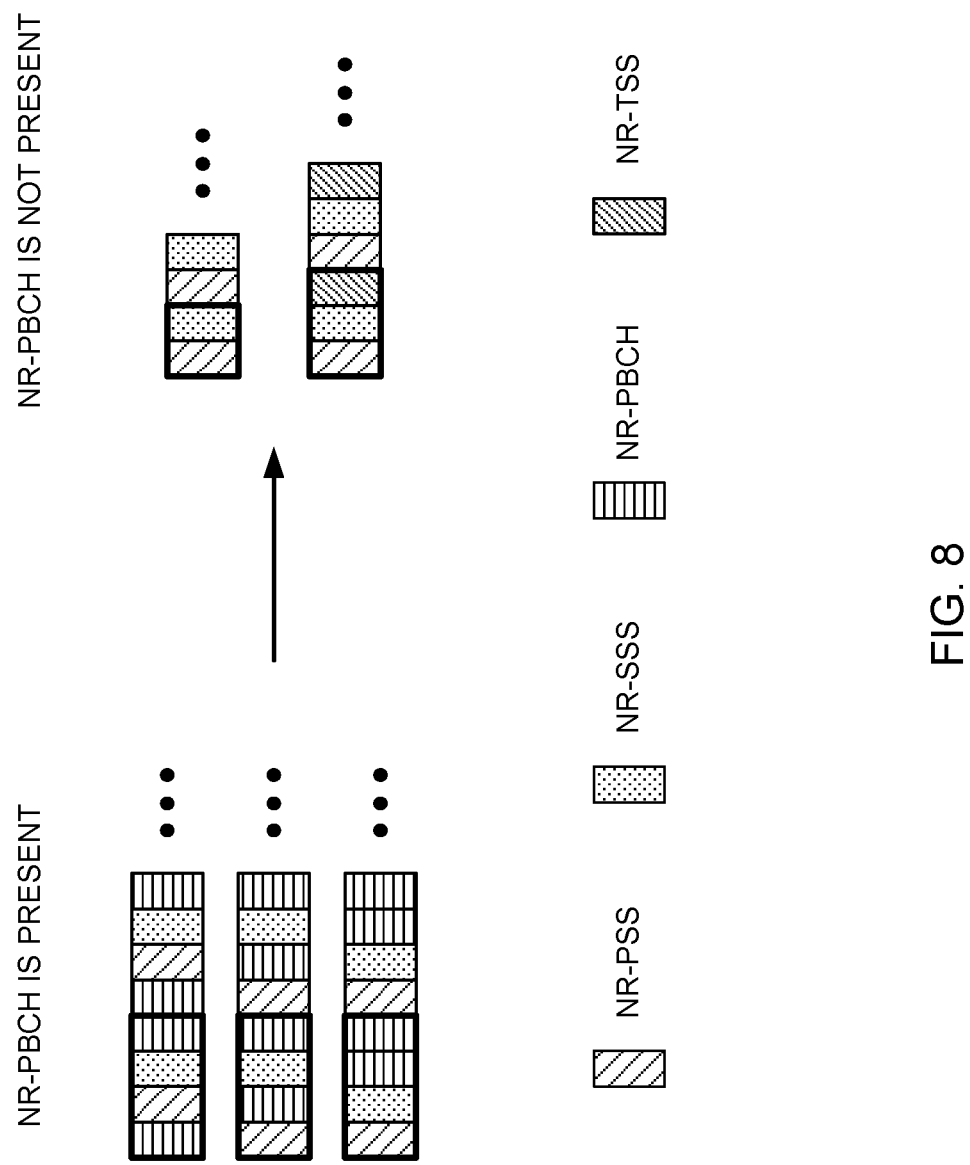
FIG. 8 is a diagram to show other examples of SS block configurations based on whether or not PBCH is configured.

The left half of FIG. 8 shows SS block configurations for when NR-PBCHs are configured, and the right half of FIG. 8 shows SS block configurations for when NR-PBCHs are not configured. In SS block configurations in which no NR-PBCH is configured, the allocation of the NR-PSS/SSS is defined without considering the location to allocate the NR-PBCH. Also, in SS block configurations in which no NR-PBCH is configured, different signals from the NR-PSS/SSS (for example, TSS) may be defined.

<Asynchronous Operation>

When it is reported that varying cells are not synchronized, or when no report is received to the effect that varying cells are synchronized, the user terminal determines that the SFN is different (for example, the SFN offset is 1 or more) between these varying cells, and controls the processes for connecting with the second cell.

When the NR-PBCH is configured in the second cell, the user terminal can detect the NR-PBCH and identify the timing of the second cell (for example, the SFN, information pertaining to part of the SFN, etc.) (see FIG. 6C). Information as to whether or not the NR-PBCH is configured may be reported from the radio base station (MeNB) to the user terminal.

Also, even when the first cell and the second cell operate asynchronously, if the radio base station (for example, MeNB) knows about the SFN offset between the first cell and the second cell, information about this SFN offset may be reported to the user terminal. The user terminal can identify the SFN of the second cell based on the SFN of the first cell and the information about the SFN offset.

Also, when no NR-PBCH is configured in the second cell, the radio base station (MeNB) may report the information about the SFN offset to the user terminal (see FIG. 6D). The user terminal can identify the SFN of the second cell based on the SFN of the first cell and the information about the SFN offset. Furthermore, the user terminal may perform receiving processes based on the assumption of SS block configurations in which no NR-PBCH is configured in the second cell.

In this way, the processes for connecting with a predetermined cell are controlled by reporting information about the synchronization between a number cells to a user terminal, so that it is possible to simplify the receiving processes and the like in the user terminal (in particular, during synchronous operation).

SECOND EXAMPLE

In a second example of the present invention, a case will be described where information (also referred to as "assist information") that allows the user terminal to find the time index on a per symbol basis and/or on a per slot basis in the second cell is reported from the first cell to the user terminal (see FIG. 5). In the following description, cases will be explained in which the second cell is a 5G/NR cell to use at least beamforming (BF). Obviously, this cell configuration is by no means limiting.

The network (for example, radio base station (MeNB)) reports assist information for allowing the user terminal to acquire the time index in the second cell (PSCell), from the first cell to the user terminal. The radio base station (MeNB) may report at least one of system information, synchronization information, and information about the configuration of the NR-PBCH and assist information to the user terminal together.

The assist information may be information about SS blocks transmitted in the second cell. The information about SS block includes at least one of information about the indices of SS blocks transmitted in the second cell, the number of SS blocks transmitted in the second cell, information as to whether or not a signal for acquiring SS block indices is available, and information about the range of SS block indices. Note that the SS blocks transmitted in the second cell may be associated with given beams (or BPLs, radio resources, etc.), and the SS blocks may be replaced by beams (or BPLs, radio resources, etc.). Alternatively, the assist information may be information about the beam operation (single-beam operation or multi-beam operation) in the second cell.

The radio base station (MeNB) may transmit predetermined assist information according to the mode of transmission (single-beam operation or multi-beam operation) that is employed in the second cell. In the following, the assist information to be reported to the user terminal during single-beam operation and the assist information to be reported to the user terminal during multi-beam operation will be described.

<Single-Beam Operation>

When the second cell works in single-beam operation, the radio base station (for example, MeNB) reports predetermined SS block index information transmitted in the second cell to the user terminal, by higher layer signaling and so on. The predetermined SS block index information may be reported to the user terminal simultaneously (for example, may be included in the same information element) with one of system information, synchronization information, and NR-PBCH configuration information. Also, predetermined SS block indices may be defined in association with predetermined time indices (for example, predetermined symbols and/or predetermined slots).

The user terminal can identify the predetermined time index (for example, a predetermined symbol and/or predetermined slot) corresponding to an SS block by detecting the synchronization signal (for example, NR-PSS/SSS) included in the SS block. In this way, predetermined SS block indices are defined in association with predetermined time indices, so that, when an SS block index is detected, the user terminal can determine at which timing in the radio frame this SS block was transmitted. In this case, the user terminal can identify the time index in the second cell without detecting the NR-PBCH.

<Multi-Beam Operation>

When the second cell works in multi-beam operation, the radio base station (for example, MeNB) may report information as to whether or not the signal for acquiring SS block indices (or beam indices) transmitted in the second cell is available and/or information about the range of SS block indices to the user terminal, by way of higher layer signaling and so on. When the signal for acquiring SS block indices is transmitted in the second cell, the user terminal detects the SS block index-acquiring signal, in addition to the NR-PSS/SSS transmitted from the second cell (for example, NR cell), and finds the time indices.

Note that the information as to whether or not the signal for acquiring SS block indices is available does not have to be reported. Also, the user terminal may perform receiving processes on assumption that SS block index-acquiring signals are transmitted when multi-beam operation is employed.

Other block synchronization signals (TSS) different from NR-PSS/SSS may be used as the SS block index-acquiring signal. In this case, by associating the TSS sequence pattern with the SS block index, the user terminal can identify the SS block index (time index corresponding to the SS block index) based on the detected TSS. In this way, by using TSS instead of NR-PBCH including information such as SFN, the signal overhead can be reduced and reliable detection is enabled by 1 transmission.

Alternatively, as for the SS block index-acquiring signal, a PBCH that is different in configuration (second NR-PBCH) from the NR-PBCH transmitted (first NR-PBCH) may be used when the second cell works in stand-alone operation or the like. For example, information (bits) to be included in the second NR-PBCH is made smaller than that in the first NR-PBCH. For example, the second NR-PBCH may be designed to include only SS block indices. In this way, by using the second NR-PBCH, the coding rate and the amount of resources can be reduced, so that the overhead can be reduced and reliable detection is enabled by 1 transmission. Note that an SS block may be comprised of an NR-PSS/SSS and a second NR-PBCH.

Also, when the second cell works in asynchronous/non-stand-alone operation, a second NR-PBCH that is designed differently from the first NR-PBCH transmitted when the second cell works in stand-alone operation may be used. In this case, information about the SS block index and the SFN (or at least part of the SFN) may be included in the second NR-PBCH and reported to the user terminal. Alternatively, the NR-PBCH including information about the SFN (or at least part of the SFN) and the TSS associated with the predetermined SS block index may be reported to the user terminal.

<Reporting of Assist Information and User Terminal Operation>

Both single-beam operation and multi-beam operation may be supported in the second cell. In this case, the radio base station (for example, the MeNB) may report, as assist information, at least one of information about beam operation (example 1), information about the number of beams and beam indices (or the number of SS blocks and SS block indices) (example 2), information about on/off of each beam (example 3), and information as to whether or not symbol synchronization is established (example 4). The user terminal operation in each example will be described below. Note that information about the synchronization between the first cell and the second cell is reported from the radio base station to the user terminal, apart from the assist information, or with the assist information. Also, in the following example, it is preferable to use it when the first cell and the second cell work in synchronous operation.

EXAMPLE 1

The radio base station (MeNB) reports beam operation-related information (for example, 1 bit) indicating whether the beam operation in the second cell is single-beam operation or multi-beam operation, to the user terminal. In this case, the SS block index (for example, beam index) transmitted in the second cell may be configured on a fixed basis.

If it is reported that the second cell works in single-beam operation, the user terminal assumes that synchronization signals (for example, NR-PSS/SSS) to be detected in the second cell correspond to predetermined SS block indices. Then, the user terminal finds the time indices, on a per symbol basis and/or on a per slot basis, based on the time indices (symbols and/or slots) corresponding to the predetermined SS block indices.

If it is reported that the second cell works in multi-beam operation, the user terminal performs receiving processes on the assumption of predetermined SS block configurations. Also, the user terminal may perform receiving processes on assumption that SS block index-acquiring signals are transmitted. The user terminal can identify a predetermined SS block index based on a predetermined synchronization signal (for example, NR-PSS/SSS) that is detected, and an SS block index-acquiring signal (for example, a TSS and/or a second NR-PBCH). Each SS block may be comprised of an NR-PSS/SSS and a SS block index-acquiring signal.

EXAMPLE 2

The radio base station reports the number of beams (or the number of SS blocks) transmitted in the second cell and active beam indices (or SS block indices) to the user terminal. For example, in the event of single-beam operation, it is reported to the user terminal that there is 1 beam, and, in the event of multi-beam operation, it is reported to the user terminal that there are multiple (two or more) beams. Also, in addition to the number of beams, the beam index information for use for transmitting SS blocks is reported to the user terminal.

If the second cell works in single-beam operation, for example, the radio base station reports the assist information to the user terminal to the effect that the number of beams is 1 and that the active beam is beam index #X. The user terminal conducts receiving processes on assumption that the NR-PSS/SSS transmitted in the second cell corresponds to SS block index #X. When the user terminal detects an SS block (for example, NR-PSS/SSS) at a predetermined timing, the user terminal can recognize that the predetermined timing is the time index corresponding to SS block index #X.

If the second cell works in multi-beam operation, for example, the radio base station reports the assist information to the user terminal to the effect that the number of beams is N and that the active beams include beam indices $\#X_{-1}$ to $X_{-N}$. The user terminal performs receiving processes on assumption that the NR-PSS/SSS corresponding to SS block indices $\#X_{-1}$ to $X_{-N}$ are transmitted in the second cell. Also, the user terminal may perform receiving processes on assumption that SS block index-acquiring signals, corresponding to each NR-PSS/SSS, are transmitted. Also, the user terminal may perform the detection process only for a predetermined period based on the reported beam indices (or SS block indices).

The user terminal can identify a predetermined SS block index based on a predetermined synchronization signal (for example, NR-PSS/SSS) that is detected, and an SS block index-acquiring signal (for example, a TSS and/or a second NR-PBCH). Each SS block may be comprised of an NR-PSS/SSS and a SS block index-acquiring signal.

In multi-beam operation, a predetermined number of beam indices (or SS block indices) are reported to the user terminal in advance, so that the range of SS blocks the user terminal searches (detection period) can be narrowed down. Note that the beam indices to be reported to the user terminal may be contiguous or non-contiguous.

EXAMPLE 3

The radio base station may report ON/OFF of each beam index to the user terminal using a bitmap. For example, in single-beam operation, it is reported to the user terminal, by using a bitmap, that 1 beam is on. For example, in multi-beam operation, it is reported to the user terminal, by using a bitmap, that multiple beams are on.

When the second cell works in single-beam operation, it is reported to the user terminal, by using a bitmap, that 1 beam index (for example, beam index #X) is on. The user terminal can identify the time index on assumption that an SS block detected in the second cell corresponds to beam index #X reported based on the bitmap.

If the second cell works in multi-beam operation, for example, the radio base station reports to the user terminal that the beams that are on include beam indices $\#X_{-1}$ to $X_{-N}$, by using a bitmap. The user terminal performs receiving processes on assumption that the NR-PSS/SSS corresponding to SS block indices $\#X_{-1}$ to $X_{-N}$ are transmitted in the second cell. Also, the user terminal may perform receiving processes on assumption that SS block index-acquiring signals, corresponding to each NR-PSS/SSS, are transmitted. Also, the user terminal may perform the detection process only for a predetermined period based on the reported beam indices (or SS block indices).

The user terminal can identify a predetermined SS block index based on a predetermined synchronization signal (for example, NR-PSS/SSS) that is detected, and an SS block index-acquiring signal (for example, a TSS and/or a second NR-PBCH). Each SS block may be comprised of an NR-PSS/SSS and a SS block index-acquiring signal.

In multi-beam operation, a predetermined number of beam indices (or SS block indices) are reported to the user terminal in advance, so that the range of SS blocks the user terminal searches (detection period) can be narrowed down. Note that the beam indices to be reported to the user terminal may be contiguous or non-contiguous.

Also, the number of bits required for the bitmap-reporting may be a fixed value based on the maximum number of SS blocks per frequency band.

EXAMPLE 4

In addition to information about the synchronization (for example, whether or not SFN synchronization has been established) between the first cell and the second cell, the radio base station may report information as to whether or not symbol synchronization is established (for example, symbol offset) and/or whether or not slot synchronization is established (for example, slot offset). If the symbol offset is less than the predetermined value (for example, less than the number of symbols that form the slot), the user terminal can control the transmitting and receiving processes on assumption that the slot timing in the second cell matches that of the first cell.

In addition, when symbol synchronization is established between the first cell and the second cell, the user terminal may perform processes for connecting with the second cell without reading SS block indices in the multi-beam operation.

(Variations of Examples)

The operation on the user terminal side when no synchronization information is received (default operation) may be defined in advance. For example, when no synchronization information is received from the first cell, the user terminal controls the processes for connecting with the second cell based on the assumption that the first cell and the second cell are not synchronized. For example, when no synchronization information is received from the first cell, the user terminal controls the processes for connecting with the second cell based on the assumption that the first cell and the second cell are synchronized.

Also, the operation on the user terminal side when information about the mode of operation in the second cell is not received (default operation) may be defined in advance. For example, when information about the beam operation (including information about the number of beams) in the second cell is not received from the first cell, the user terminal controls the processes for connecting with the second cell on assumption that the second cell works in single-beam operation. Alternatively, when information about the beam operation (including information about the number of beams) in the second cell is not received from the first cell, the user terminal controls the processes for connecting with the second cell on assumption that the second cell works in multi-beam operation.

Also, the user terminal may measure the SFN offset between the first cell and the second cell and report it to the radio base station. In this case, the user terminal may report to the radio base station whether or not the user terminal supports the UE capability for measuring and/or reporting offsets between different cells. The radio base station may configure offset measurement and/or reporting, by higher layer signaling (or MAC signal), to a user terminal that supports the UE capability for measuring and/or reporting offsets between different cells. Also, a user terminal to support the UE capability for measuring and/or reporting offsets between different cells may be designed to send reports to the radio base station when the SFN offset value reported as synchronization information is different from the SFN offset value measured at the user terminal. For example, when the difference between the reported SFN value and the SFN value measured by the user terminal is greater than or equal to a predetermined value, the user terminal reports to that effect to the radio base station. Thus, regarding whether the user terminal sends a report or not, an event trigger using a predetermined value as a trigger condition may be configured. The predetermined value may be defined in advance by the specification, or may be configured from the radio base station to the user terminal. In this way, by reporting SFN offset information from the user terminal to the radio base station, it is possible for the user terminal and the radio base station to share an understanding as to whether or not varying cells are synchronized (offset information).

(Radio Communication System)

Now, the structure of the radio communication system according to one embodiment of the present invention will be described below. In this radio communication system, communication is performed using one or a combination of the herein-contained embodiments of the present invention.

Figure 9:
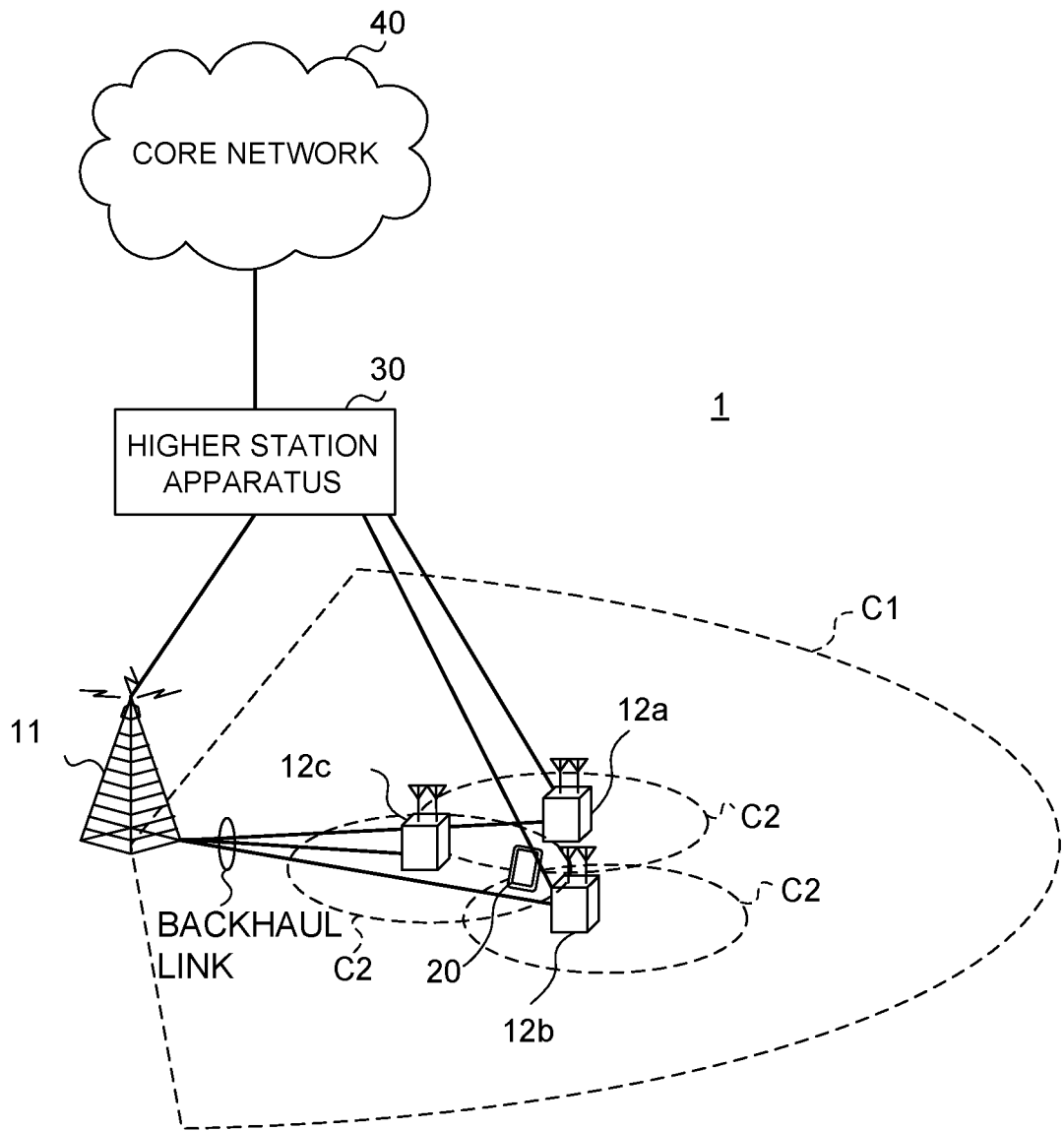
FIG. 9 is a diagram to show an exemplary schematic structure of a radio communication system according to one embodiment of the present invention.

FIG. 9 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell Cl and the small cells C2 at the same time by means of CA or DC. Furthermore, the user terminals 20 may apply CA or DC using a number of cells (CCs) (for example, five or fewer CCs or six or more CCs). For example, in DC, the MeNB (MCG) communicates by using LTE cells, and SeNBs (SCGs) communicate by using NR/5G cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH. A shared control channel that reports the presence or absence of a paging channel is mapped to a downlink L1/L2 control channel (for example, PDCCH), and the paging channel (PCH) data is mapped to the PDSCH. Downlink reference signals, uplink reference signals and physical downlink synchronization signals are allocated separately.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated in the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
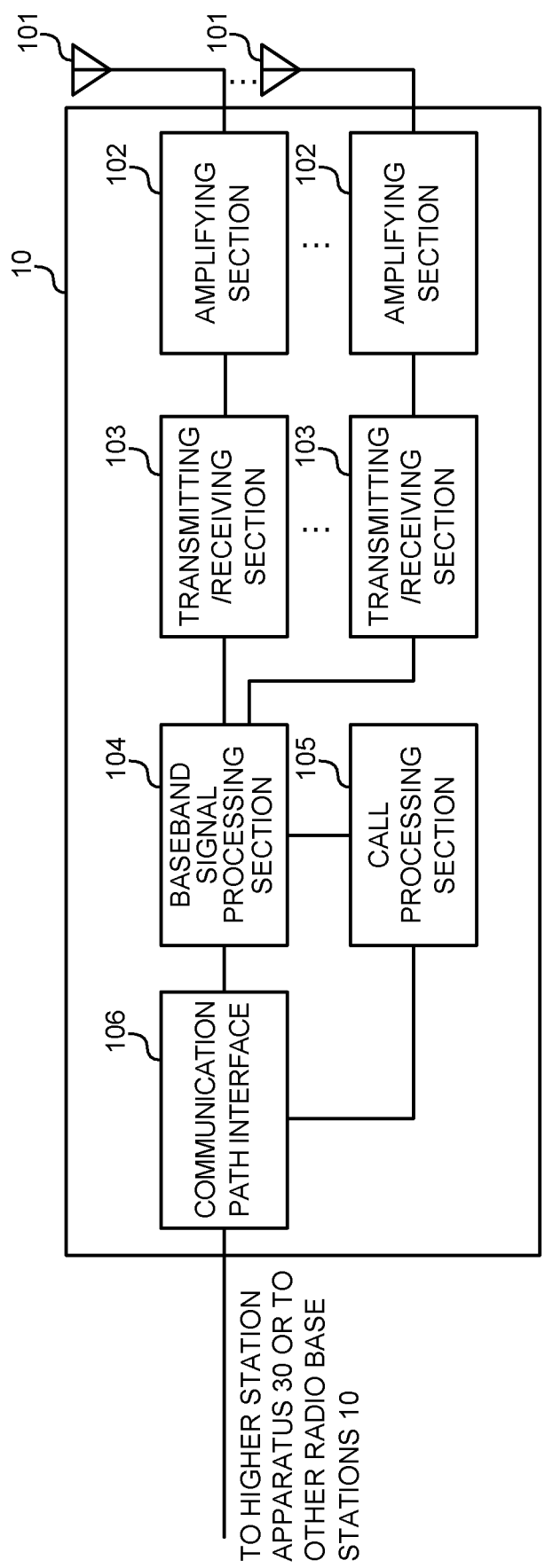
FIG. 10 is a diagram to show an exemplary overall structure of a radio base station according to one embodiment of the present invention.

FIG. 10 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 include an analog beam forming section that is configured to be able to adopt both multi-beam approach and single-beam approach, and that provides analog beam forming. When a synchronization signal and/or a paging channel are transmitted based on the multi-beam approach, beam sweeping is executed, whereby beams are switched (sweeping) every 1 symbol or multiple contiguous symbols as 1 unit. The beamforming section may be constituted by a beamforming circuit (for example, a phase shifter, a phase shifting circuit, etc.) or beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 transmit a synchronization signal (NR-PSS/SSS), broadcast channel (NR-PBCH), system information (SIB), SS block, synchronization information, assist information and the like. For example, the transmitting/receiving sections 103 transmit information about the mode of beams in a predetermined cell and/or information about the configuration of SS blocks (for example, the indices of synchronization signal blocks) as assist information.

Figure 11:
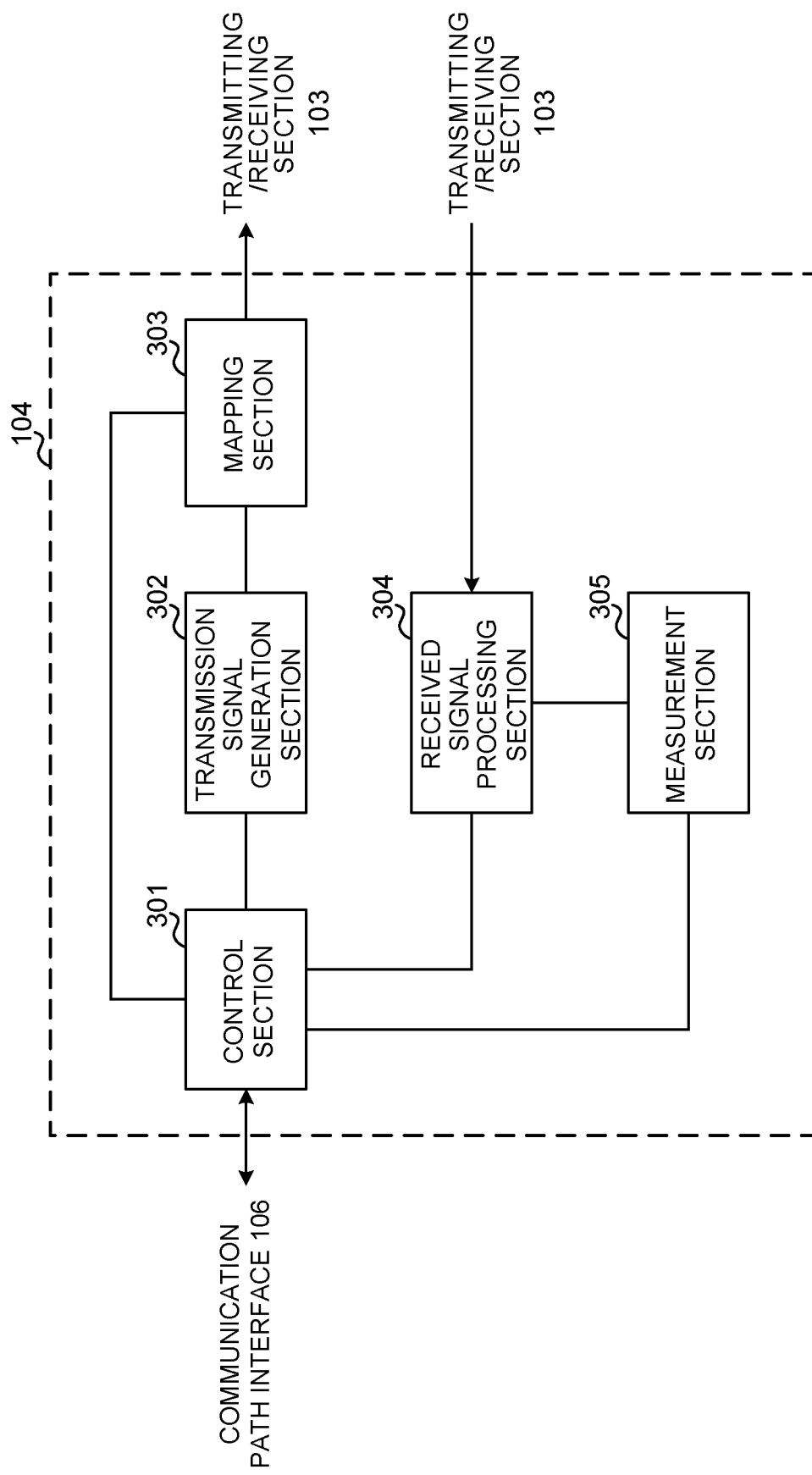
FIG. 11 is a diagram to show an exemplary functional structure of a radio base station according to one embodiment of the present invention.

FIG. 11 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beamforming functions for providing digital beamforming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302 (including signals that correspond to synchronization signals, the MIB, paging channels, and broadcast channels and so on), allocation of signals in the mapping section 303, and so on.

The control section 301 controls scheduling of system information (SIBs, the MIB, etc.), downlink data signals that are transmitted in the PDSCH (including the PCH for paging messages), and downlink control signals that are transmitted in the PDCCH and/or the EPDCCH (covering, for example, resource allocation, the shared control channel that reports whether or not a paging message is present, the signal to report the multi-beam approach or the single-beam approach, and so on).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. FIG. 11 is a diagram to show an exemplary functional structure of a radio base station according to one embodiment of the present invention.

The measurement section 305 conducts measurements with respect to the received signal. The measurement section 305 can be constituted by a measurer, a measurement circuit or measurement apparatus that can be described based on general understanding of the technical field to which the present invention pertains.

The measurement section 305 may measure, for example, the received power (for example, RSRP (Reference Signal Received Power)), the received quality (for example, RSRQ (Reference Signal Received Quality)), the SINR (Signal to Interference plus Noise Ratio), channel states and so on of the received signals. The measurement results may be output to the control section 301.

(User Terminal)

Figure 12:
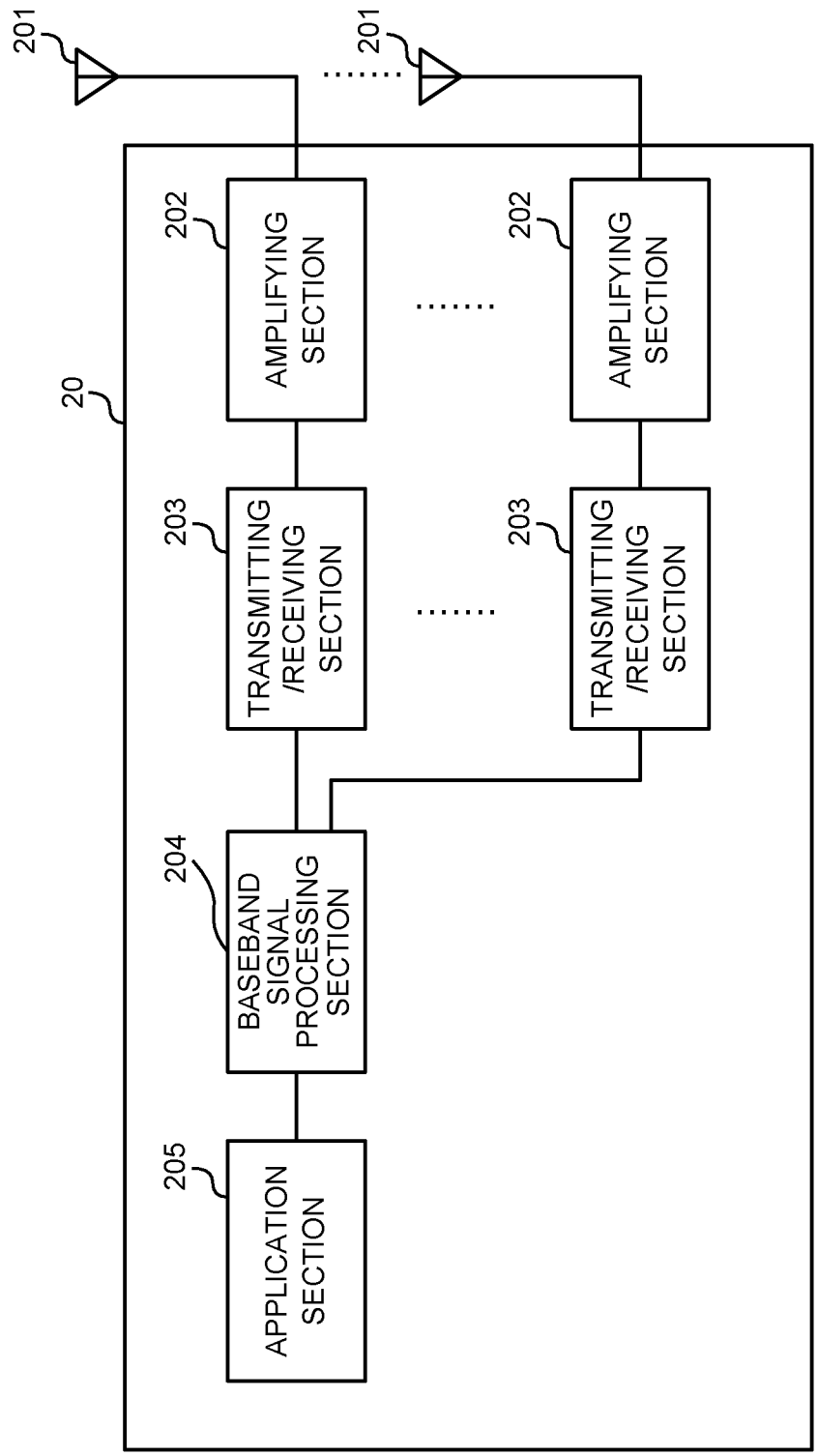
FIG. 12 is a diagram to show an exemplary overall structure of a user terminal according to one embodiment of the present invention.

FIG. 12 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 transmit a synchronization signal (NR-PSS/SSS), broadcast channel (NR-PBCH), system information (SIB), SS block, synchronization information, assist information and the like. For example, the transmitting/receiving sections 203 transmit information about the mode of beams in a predetermined cell and/or information about the configuration of SS blocks (for example, the indices of synchronization signal blocks) as assist information.

Figure 13:
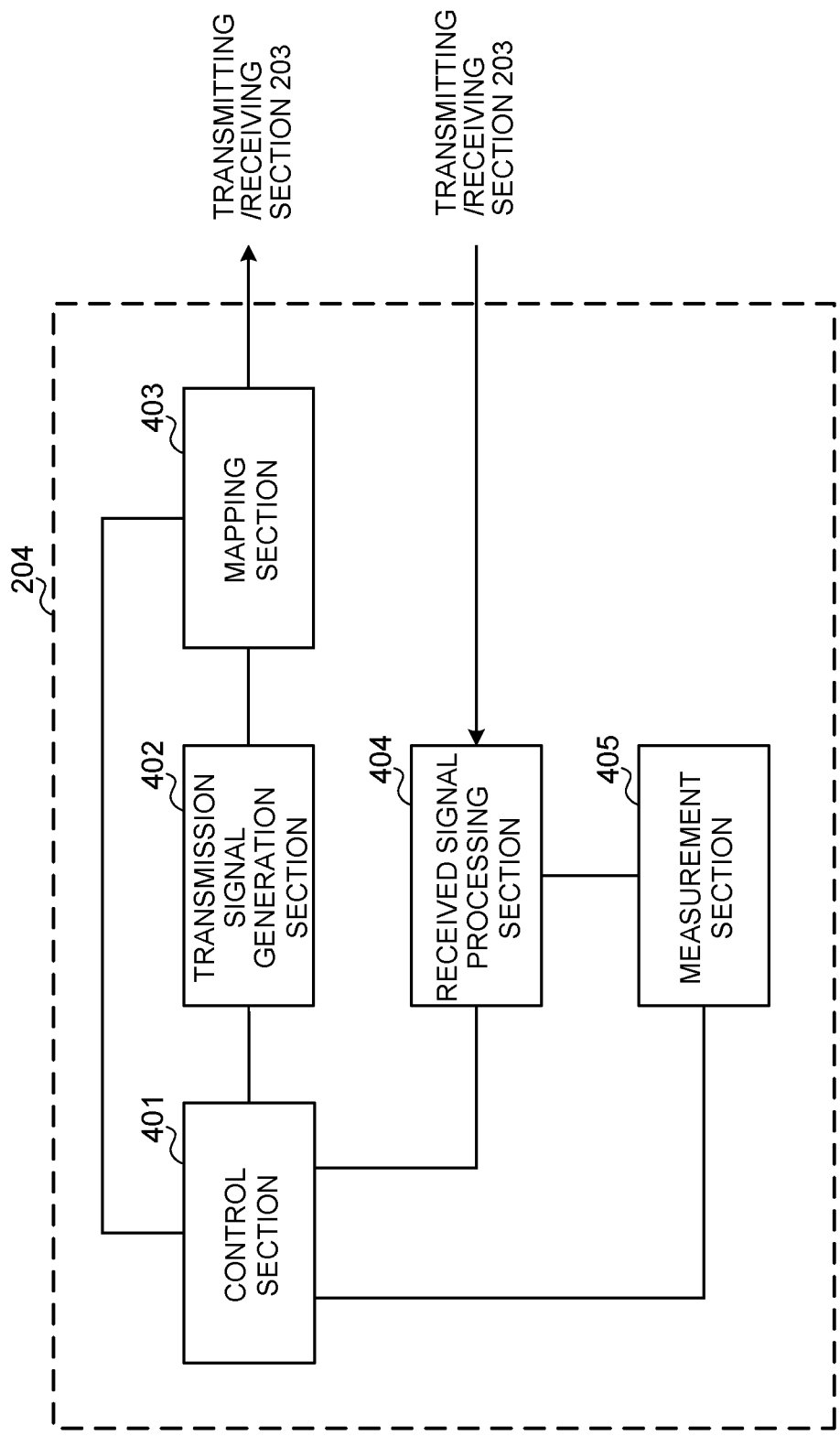
FIG. 13 is a diagram to show an exemplary functional structure of a user terminal according to one embodiment of the present invention.

FIG. 13 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 controls the processes for connecting with a predetermined cell (for example, PSCell) based on information about synchronization and/or information about the configuration of synchronization signal blocks. For example, the control section 401 controls whether or not to receive a broadcast channel transmitted from a predetermined cell based on information about synchronization and/or information about the configuration of synchronization signal blocks.

Also, when information to indicate that the first cell and the second cell are synchronized or information to indicate that the time offset between the first cell and the second cell is equal to or less than a predetermined value is received, the control section 401 judges that the system frame number of the first cell and the system frame number of the second cell are the same.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information and/or channel state information (CSI) based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

As commanded by the control section 401, the received signal processing section 404 receives synchronization signals and broadcast channels, which the radio base station transmits by applying beamforming. In particular, the received signal processing section 404 receives the synchronization signal and broadcast channel that are allocated to at least one of a plurality of time fields (for example, symbols) that constitute a predetermined transmission time interval (for example, a subframe or a slot).

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 conducts measurements using beamforming RSs transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR, etc.), channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 14:
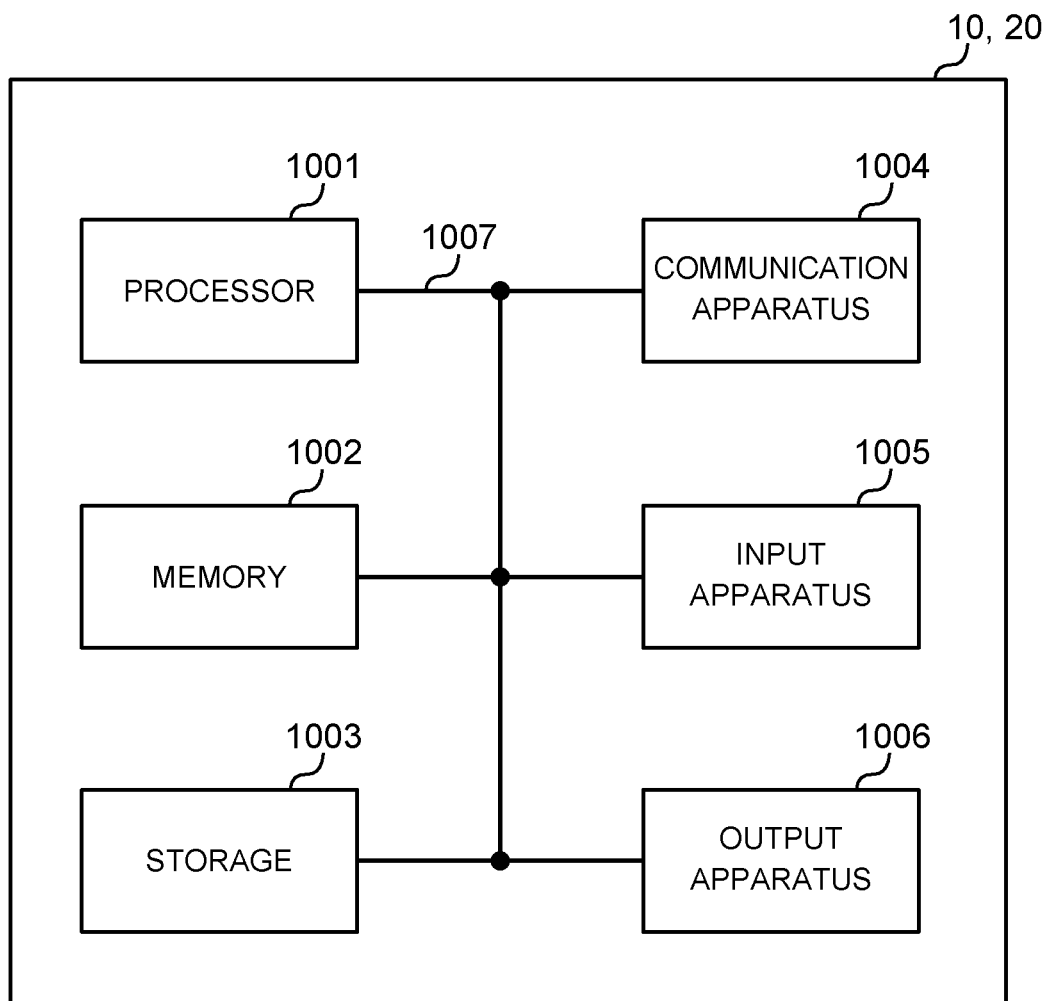
FIG. 14 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 14 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, 1 subframe may be referred to as a "transmission time interval (TTI)," a plurality of consecutive subframes may be referred to as a "TTI," or 1 slot may be referred to as a "TTI." That is, a subframe and a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
    a receiver that receives by higher layer signaling in a first cell, when a plurality of cells including the first cell and a second cell are configured, information related to a synchronization signal block index indicated by using a bitmap; and
    a controller that controls a reception of a synchronization signal block based on the information related to the synchronization signal block index.

2. The terminal according to claim 1, wherein the first cell is included in a master cell group and the second cell is included in a secondary cell group.

3. The terminal according to claim 2, wherein a number of bits needed for transmitting the information that is notified by the bitmap is determined based on a maximum number of synchronization signal blocks per frequency band.

4. The terminal according to claim 2, wherein each synchronization signal block index corresponds to a separate time index.

5. The terminal according to claim 1, wherein the information related to the synchronization signal block index comprises information notified by using the bitmap, related to whether or not a plurality of synchronization signal block indexes is transmitted.

6. The terminal according to claim 1, wherein a subcarrier spacing of the second cell supports a different subcarrier spacing than the first cell.

7. The terminal according to claim 1, wherein each synchronization signal block index corresponds to a separate time index.

8. The terminal according to claim 1, wherein the first cell is included in a master cell group for LTE and the second cell is included in a secondary cell group for NR.

9. The terminal according to claim 8, wherein each synchronization signal block index corresponds to a separate time index.

10. A radio communication method comprising:
    when a plurality of cells including the first cell and a second cell are configured,
    receiving, by higher layer signaling in the first cell, information related to a synchronization signal block index indicated by using a bitmap; and
    controlling reception of a synchronization signal block based on the information related to the synchronization signal block index.

11. A base station comprising:
    a transmitter that transmits by higher layer signaling in a first cell, when a plurality of cells including the first cell and a second cell are configured, information related to a synchronization signal block index indicated by using a bitmap; and
    a controller that controls a transmission of a synchronization signal block based on the information related to the synchronization signal block index.

12. A system comprising a terminal and a base station, wherein:
    the terminal comprises:
        a receiver that receives by higher layer signaling in a first cell, when a plurality of cells including the first cell and a second cell are configured, information related to a synchronization signal block index indicated by using a bitmap; and
        a first controller that controls a reception of a synchronization signal block based on the information related to the synchronization signal block index; and
    the base station comprises:
        a transmitter that transmits the information related to the synchronization signal block index by higher layer signaling; and
        a second controller that controls a transmission of the synchronization signal block based on the information related to the synchronization signal block index.

* * * * *